United States Patent
Wang et al.

(10) Patent No.: US 10,582,462 B2
(45) Date of Patent: Mar. 3, 2020

(54) SYNCHRONIZATION METHOD AND APPARATUS

(71) Applicant: Huawei Technologies Co., Ltd., Shenzhen, Guangdong (CN)

(72) Inventors: Man Wang, Shanghai (CN); Henrik Olofsson, Kista (SE); Liwei Qiu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/894,091

(22) Filed: Feb. 12, 2018

(65) Prior Publication Data

US 2018/0167900 A1   Jun. 14, 2018

Related U.S. Application Data

(63) Continuation of application No. PCT/CN2015/086835, filed on Aug. 13, 2015.

(51) Int. Cl.
*H04W 56/00* (2009.01)
*H04W 88/08* (2009.01)

(52) U.S. Cl.
CPC ....... *H04W 56/001* (2013.01); *H04W 56/004* (2013.01)

(58) Field of Classification Search
CPC . H04W 56/00; H04W 56/001; H04W 56/004; H04W 88/08; H04W 56/0015;
(Continued)

(56) References Cited

U.S. PATENT DOCUMENTS

| 6,483,856 B1 * | 11/2002 | Bird | H04J 3/0644 |
| | | | 342/357.4 |
| 7,477,191 B2 * | 1/2009 | Lyons | G01S 5/021 |
| | | | 342/387 |

(Continued)

FOREIGN PATENT DOCUMENTS

| CN | 101075848 A | 11/2007 |
| CN | 101395935 A | 3/2009 |

(Continued)

OTHER PUBLICATIONS

"IEEE Standard for a Precision Clock Synchronization Protocol for Networked Measurement and Control Systems"; IEEE Std 1588™—2008(Revision of IEEE Std 1588-2002); IEEE Instrumentation and Measurement Society; Jul. 24, 2008, 289 pages.

*Primary Examiner* — Tri H Phan
(74) *Attorney, Agent, or Firm* — Womble Bond Dickinson (US) LLP

(57) ABSTRACT

According to a synchronization method and apparatus provided in this application, a source station sends location information of the source station; and after obtaining a signal propagation delay that is calculated according to the location information of the source station and location information of a to-be-synchronized station, the to-be-synchronized station performs synchronization with the source station according to a synchronization reference time obtained by subtracting the propagation delay from a receiving time of a first network reference signal received from the source station. It can be learned that, in a process in which the to-be-synchronized station performs synchronization with the source station, the signal propagation delay between the to-be-synchronized station and the source station is used to compensate for the receiving time of the first network reference signal. Therefore, the consumed propa-
(Continued)

gation delay can be subtracted from the synchronization reference time, so that synchronization accuracy is improved.

13 Claims, 10 Drawing Sheets

(58) Field of Classification Search
CPC ........... H04W 56/0025; H04W 56/003; H04W 56/0035; H04W 56/0045; H04W 56/005; H04W 56/0055; H04W 56/006; H04W 56/0065; H04W 72/04; H04B 7/269; H04B 7/2687; H04B 7/2693; H04B 7/2696
See application file for complete search history.

(56) References Cited

U.S. PATENT DOCUMENTS

| | | | |
|---|---|---|---|
| 7,729,707 B2* | 6/2010 | Aljadeff | H04W 56/0075 342/450 |
| 7,801,108 B2* | 9/2010 | Krasner | G01S 11/08 370/350 |
| 8,078,114 B2* | 12/2011 | Erlenbach | H04J 3/0682 455/502 |
| 8,335,173 B2* | 12/2012 | Hart | G01S 5/0226 370/310 |
| 9,042,296 B2* | 5/2015 | Palanki | H04W 56/0015 370/328 |
| 9,091,746 B2* | 7/2015 | Fischer | G01S 5/0242 |
| 9,344,985 B2* | 5/2016 | Loehr | H04W 56/0005 |
| 9,877,161 B2* | 1/2018 | Persson | G01S 5/0036 |
| 9,900,856 B2* | 2/2018 | Wu | H04B 7/18502 |
| 9,913,233 B2* | 3/2018 | Abedini | H04W 56/0015 |
| 9,999,010 B2* | 6/2018 | Segev | H04W 56/001 |
| 10,045,324 B2* | 8/2018 | Zaidi | H04W 64/00 |
| 2002/0053985 A1 | 5/2002 | Nesbitt | |
| 2007/0021122 A1 | 1/2007 | Lane et al. | |
| 2009/0225743 A1 | 9/2009 | Nicholls et al. | |
| 2010/0046494 A1 | 2/2010 | Palanki et al. | |
| 2010/0061356 A1 | 3/2010 | Qvarfordt et al. | |
| 2013/0152150 A1 | 6/2013 | Zhou | |

FOREIGN PATENT DOCUMENTS

| | | |
|---|---|---|
| CN | 101860803 A | 10/2010 |
| CN | 104581923 A | 4/2015 |
| JP | 2009260881 A | 11/2009 |
| WO | 2015042954 A1 | 4/2015 |

* cited by examiner

SYNCHRONIZATION METHOD AND APPARATUS

CROSS-REFERENCE TO RELATED APPLICATIONS

This application is a continuation of International Application No. PCT/CN2015/086835, filed on Aug. 13, 2015, which is hereby incorporated by reference in its entirety.

TECHNICAL FIELD

This application relates to the communications field, and in particular, to a synchronization method and apparatus.

BACKGROUND

With the development of wireless communications, implementation of many services needs inter-station synchronization, for example, synchronization between a macro base station and a small cell.

Network listening is a common synchronization method and mainly includes the following process: A to-be-synchronized station listens for a network reference signal broadcast by a source station, uses a time when the network reference signal is detected as a synchronization reference time, and performs synchronization with the source station according to the synchronization reference time.

The prior-art synchronization method cannot implement high-accuracy synchronization.

SUMMARY

A synchronization method and apparatus provided in this application can improve inter-station synchronization accuracy.

To achieve the foregoing objective, this application provides the following technical solutions.

A first aspect of this application provides a synchronization method, including:
  obtaining, by a first station, a signal propagation delay between the first station and a second station, where the first station is a to-be-synchronized station, and the second station is a source station;
  receiving, by the first station, a first network reference signal from the second station;
  obtaining, by the first station, a synchronization reference time by subtracting the signal propagation delay from a receiving time of the first network reference signal; and performing, by the first station, synchronization with the second station according to the synchronization reference time.

A second aspect of this application provides another synchronization method, including:
  obtaining, by a synchronization control end, location information of a station, where the location information of the station is used to determine a signal propagation delay between a first station and a second station, the first station is a to-be-synchronized station, the second station is a source station, the location information of the station includes at least location information of the second station, the signal propagation delay is used to calculate a synchronization reference time of the first station, where the synchronization reference time is used by the first station to perform synchronization with the second station, and the synchronization reference time is obtained by subtracting the signal propagation delay from a receiving time of a first network reference signal received by the first station from the second station.

A third aspect of this application provides still another synchronization method, including:
  sending, by a second station, synchronization information, where the synchronization information includes location information of the second station, the location information of the second station is used together with location information of a first station to determine a signal propagation delay between the first station and the second station, the signal propagation delay is used to calculate a synchronization reference time of the first station, the synchronization reference time is used by the first station to perform synchronization with the second station, and the synchronization reference time is obtained by subtracting the signal propagation delay from a receiving time of a first network reference signal received by the first station from the second station; or
  the synchronization information includes a signal propagation delay between the first station and the second station, the signal propagation delay is used to calculate a synchronization reference time of the first station, the synchronization reference time is used by the first station to perform synchronization with the second station, and the synchronization reference time is obtained by subtracting the signal propagation delay from a receiving time of a first network reference signal received by the first station from the second station, where
  the first station is a to-be-synchronized station, and the second station is a source station.

A fourth aspect of this application provides a station, including:
  a signal propagation delay obtaining module, configured to obtain a signal propagation delay between the station and a source station, where the station is a to-be-synchronized station;
  a receiving module, configured to receive a first network reference signal from the source station;
  a synchronization reference time obtaining module, configured to obtain a synchronization reference time by subtracting the signal propagation delay from a receiving time of the first network reference signal; and
  a synchronization module, configured to perform synchronization with the source station according to the synchronization reference time.

A fifth aspect of this application provides a synchronization apparatus, including:
  a location information obtaining module, configured to obtain location information of a station, where the location information of the station is used to determine a signal propagation delay between a first station and a second station, the first station is a to-be-synchronized station, the second station is a source station, the location information of the station includes at least location information of the second station, the signal propagation delay is used to calculate a synchronization reference time of the first station, where the synchronization reference time is used by the first station to perform synchronization with the second station, and the synchronization reference time is obtained by subtracting the signal propagation delay from a receiving time of a first network reference signal received by the first station from the second station.

A sixth aspect of this application provides another station, including:

a synchronization information sending module, configured to send synchronization information, where the synchronization information includes location information of the station, the location information of the station is used together with location information of a to-be-synchronized station to determine a signal propagation delay between the to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the propagation delay from a receiving time of a first network reference signal received by the to-be-synchronized station from the station; or the synchronization information includes a signal propagation delay between the to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the propagation delay from a receiving time of a first network reference signal received by the to-be-synchronized station from the station.

According to the synchronization method and apparatus provided in this application, the source station sends the location information of the source station; and after obtaining the signal propagation delay that is calculated according to the location information of the source station and the location information of the to-be-synchronized station, the to-be-synchronized station performs synchronization with the source station according to the synchronization reference time obtained by subtracting the propagation delay from the receiving time of the first network reference signal received from the source station. It can be learned that, in a process in which the to-be-synchronized station performs synchronization with the source station, the signal propagation delay between the to-be-synchronized station and the source station is used to compensate for the receiving time of the first network reference signal. Therefore, the consumed propagation delay can be subtracted from the synchronization reference time, so that synchronization accuracy is improved.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that, the technical solutions in the present application may be applied to various communications systems of a wireless cellular network, for example, a GSM (Global System for Mobile Communications) system, a CDMA (Code Division Multiple Access) system, a WCDMA (Wideband Code Division Multiple Access) system, a GPRS (General Packet Radio Service) system, an LTE (Long Term Evolution) system, and a UMTS (Universal Mobile Telecommunications System). This is not limited in the embodiments of the present application.

In the embodiments of the present application, a UE may also be referred to as a terminal, and may communicate with one or more core networks through a RAN (radio access network). The UE may be a mobile terminal, such as a mobile phone (or referred to as a "cellular" phone) or a computer with a mobile terminal, for example, may be a portable, pocket-sized, handheld, computer built-in, or in-vehicle mobile apparatus that exchanges voice and/or data with the radio access network. This is not limited in the embodiments of the present application.

A base station described in the embodiments of the present application may be a BTS (base transceiver station) in the GSM or CDMA system, a Node B in the WCDMA system, or an evolved NodeB (eNode B, eNB) in the LTE system. This is not limited in the embodiments of the present application.

A synchronization method and apparatus disclosed in the embodiments of this application are used to perform synchronization between stations of a communications system. The "station" may include a macro cell and a small cell. The small cell may be a micro cell, a pico cell, a femto cell, or an entity with a simple base station function, such as a repeater or a relay station.

Figure 1:
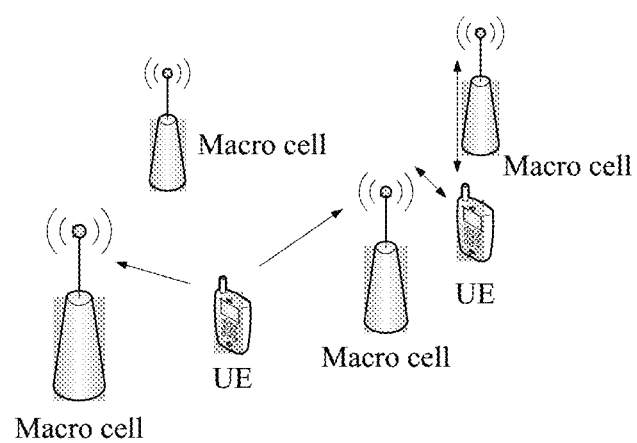
FIG. 1 is a schematic diagram of an application scenario of a synchronization method according to an embodiment of the present application.
Figure 2:
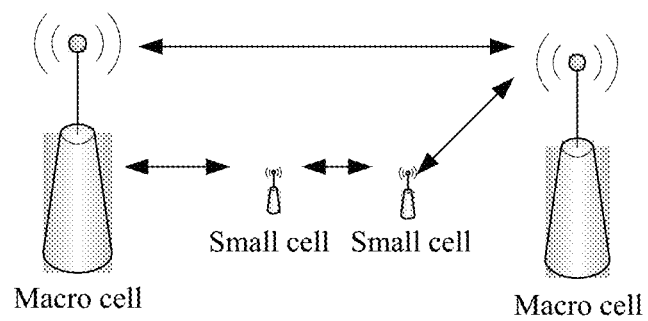
FIG. 2 is a schematic diagram of another application scenario of a synchronization method according to an embodiment of the present application.

In other words, the synchronization method and apparatus described in the embodiments of this application may be used for synchronization between macro cells (a scenario shown in FIG. 1) or synchronization between a macro cell and a small cell (a scenario shown in FIG. 2).

A first station described in the embodiments of this application is a to-be-synchronized station, and a second station is a source station. In a synchronization process, the second station sends a network reference signal. In the embodiments of this application, all network reference signals sent by the second station, that is, the source station, are marked as first network reference signals.

In the application scenario shown in FIG. 1 or FIG. 2, by using a prior-art synchronization technology, a to-be-synchronized station performs synchronization with a source station according to a time when a first network reference signal is received, that is, a synchronization reference time. However, for a synchronization time, a propagation delay of a network reference signal between the source station and the to-be-synchronized station cannot be ignored. For example, if a distance from the source station to the to-be-synchronized station is greater than 300 m, the propagation delay of the network reference signal from the source station to the to-be-synchronized station is 1 µs. This time cannot be ignored considering a 3 µs synchronization accuracy. In this case, if only the receiving time of the network reference signal is used as a synchronization basis, a relatively large deviation may occur.

Figure 3:
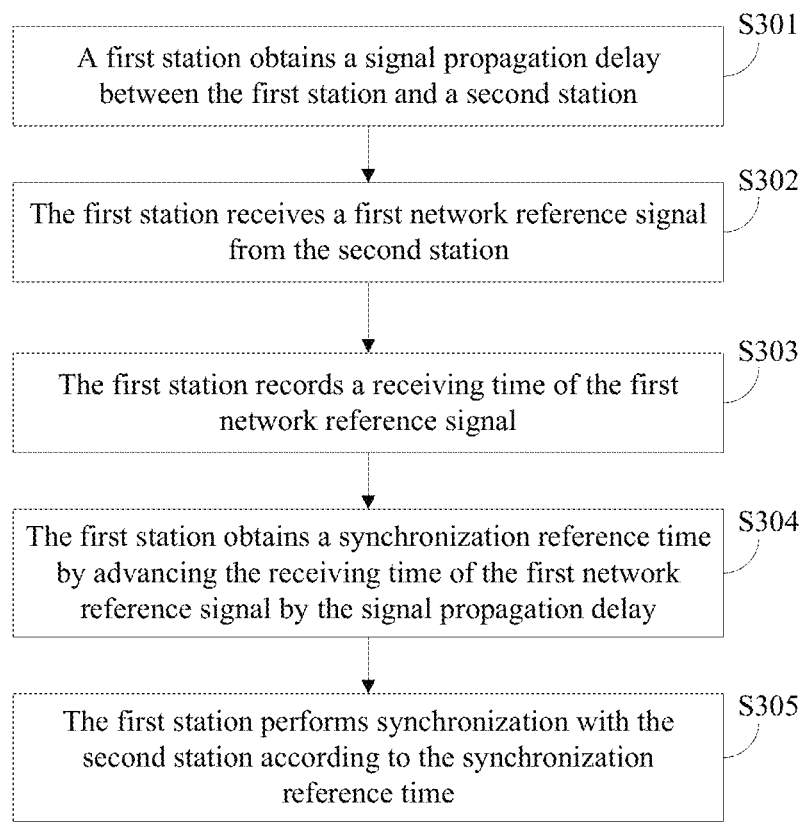
FIG. 3 is a flowchart of a synchronization method according to an embodiment of the present application.

As shown in FIG. 3, a synchronization method disclosed in an embodiment of this application includes the following steps.

S301: A first station obtains a signal propagation delay between the first station and a second station.

S302: The first station receives a first network reference signal from the second station.

S303: The first station records a receiving time of the first network reference signal.

S304: The first station obtains a synchronization reference time by subtracting the signal propagation delay from the receiving time of the first network reference signal.

Specifically, the synchronization reference time is a difference between the receiving time of the first network reference signal and the signal propagation delay.

It should be noted that, in this embodiment, it is assumed that units of the receiving time of the first network reference signal and the signal propagation delay are the same. Alternatively, before the synchronization reference time is calculated, the units of the receiving time of the first network reference signal and the signal propagation delay may be transformed to be the same. For example, both the units of the receiving time of the first network reference signal and the signal propagation delay are nanosecond.

S305: The first station performs synchronization with the second station according to the synchronization reference time.

In this embodiment, the propagation delay of the first network reference signal is used to compensate for the receiving time of the network reference signal. Compared with the prior art, this solution can ensure higher synchronization accuracy.

Figure 4:
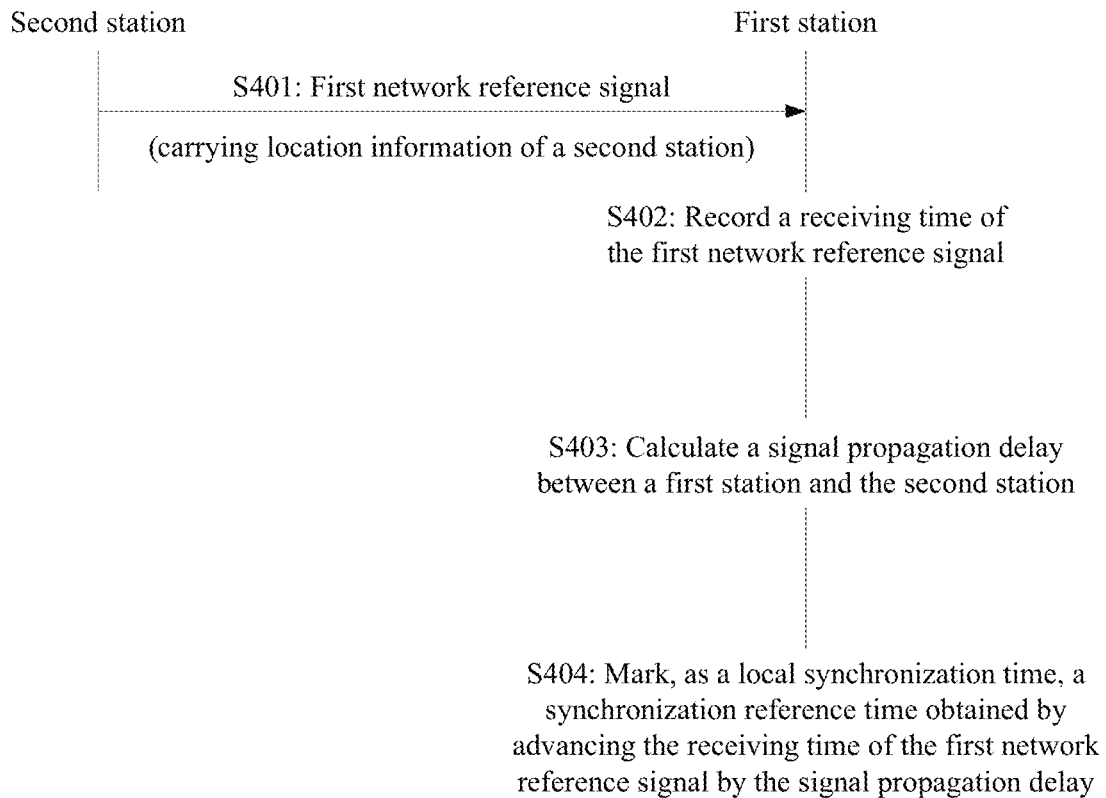
FIG. 4 is a flowchart of another synchronization method according to an embodiment of the present application.

As shown in FIG. 4, another synchronization method disclosed in an embodiment of this application includes the following steps.

S401: A second station sends a first network reference signal, where the first network reference signal carries location information of the second station.

In this embodiment, the second station may periodically broadcast the first network reference signal to trigger a synchronization process.

Specifically, the second station needs to send the first network reference signal by using a preconfigured physical resource. The physical resource includes a time domain resource, a frequency domain resource, a space domain resource, or a code resource. The time domain resource is determined according to a frame number, a subframe number, and an intra-subframe offset. The frequency domain resource may be selected from a subcarrier or several subcarriers, or a resource block (RB) or several RBs. A space domain resource includes information such as various types of multi-antenna space structures and space layering.

The first network reference signal includes but is not limited to a CRS (cell-specific reference signal), a PRS (positioning reference signal), a CSI-RS (channel state information-reference signal), and a customized reference signal of another type. This type of reference signal is triggered only in a time period when synchronization is required, is transmitted by using as few time-frequency resources as possible to reduce overheads, and is to be configured at an idle resource of a destination station, so that when the reference signal is being sent, no interference is caused to reception performed by the destination station.

Further, the preconfigured physical resource is agreed upon by a source station and the destination station in advance, and is known to the source station and the destination station. A prior agreement process is implemented specifically in the following manners: A specific physical resource for sending a network reference signal is agreed upon or determined between stations in advance, and a type of network reference signal is sent only by a specific physical resource. Alternatively, a system temporarily delivers, according to a service requirement, a specific physical resource for sending a network reference signal, and the specific physical resource and a synchronization instruction delivered by the system are sent together or separately. Alternatively, some reference signals have definitions of physical resources for sending the reference signals, the network reference signals are sent according to these network-side definitions, and the physical resources for sending the reference signals are publicly known to an entire network.

To reduce the resource overheads, the second station may send the first network reference signal only within a synchronization period and by using as few time-frequency resources as possible. To decrease interference caused by the first network reference signal to reception of another signal by the first station, the second station may send the first network reference signal by using only an idle resource of the first station.

S402: After detecting the first network reference signal, a first station records a receiving time of the first network reference signal.

S403: The first station calculates a signal propagation delay between the first station and the second station.

Specifically, the signal propagation delay is Tpd=(P1−P2)/Speed of light, where Tpd is the signal propagation delay, P1-P2 is a distance between the first station and the second station, and both P1 and P2 are location information.

Specifically, the specific location information indicated by P1 and P2 mainly includes longitude and latitude information. Longitude and latitude of P1 are represented as P1 (J1,W1) by using J1 and W1, and longitude and latitude of P2 are represented as P2 (J2, W2) by using J2 and W2. Then the specific propagation delay is) $\sqrt{|J1-J2|^2+|W1-W2|^2}$/Speed of light, where the speed of light is $3*10^8$ m/s.

S404: The first station marks, as a local synchronization time, a synchronization reference time obtained by subtracting the signal propagation delay from the receiving time of the first network reference signal.

In other words, in this embodiment, local time of the first station is not changed, and only the local synchronization time is marked. In a process of communicating with another station, the first station performs a synchronization service according to the local synchronization time.

In this embodiment, the first station calculates the signal propagation delay and then performs synchronization. Synchronization accuracy is relatively high.

It should be noted that, the signal propagation delay may be calculated by the first station, or may be sent to the first station by another station (for example, the second station). Specifically, the second station may add the propagation delay to the first network reference signal, and send the first network reference signal to the first station. The second station may obtain the signal propagation delay by using the manner of obtaining the signal propagation delay by the first station in this embodiment. The second station may obtain location information of the first station in a process of configuring resource information with the first station.

An embodiment of this application discloses another synchronization method. This embodiment may be applied to a communications system shown in FIG. 5, including several stations and a synchronization control end. Different from the foregoing embodiments, in this embodiment, the synchronization control end controls a process of synchronization between two stations.

Figure 6:
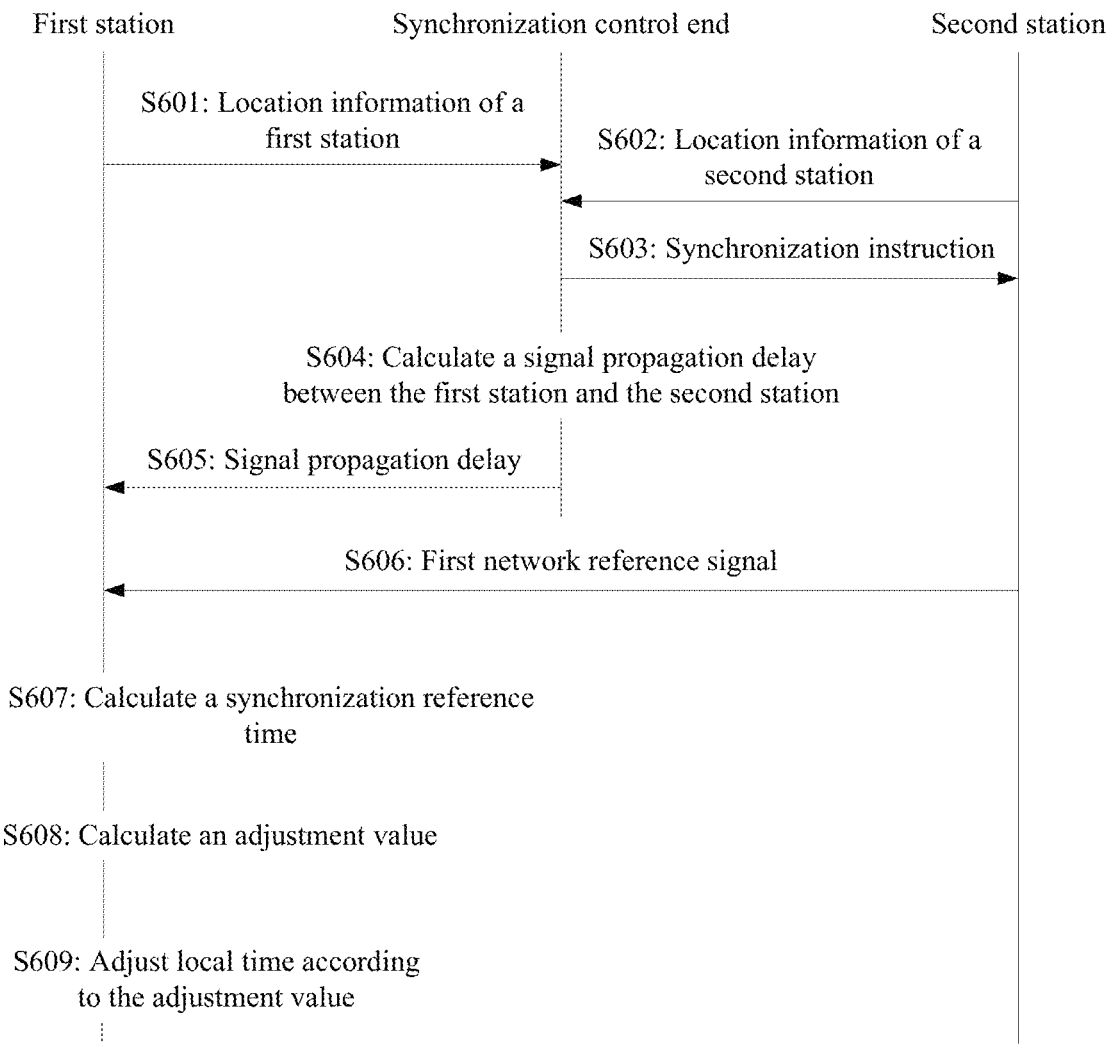
FIG. 6 is a flowchart of another synchronization method according to an embodiment of the present application.

As shown in FIG. 6, the method described in this embodiment includes the following steps.

S601: A first station sends its location information to the synchronization control end, where the location information is marked as location information of the first station.

S602: A second station sends its location information to the synchronization control end, where the location information is marked as location information of the second station.

S603: The synchronization control end sends a synchronization instruction to the second station.

S604: The synchronization control end calculates a signal propagation delay between the first station and the second station according to the location information of the first station and the location information of the second station.

A sequence of the foregoing steps is not limited.

S605: The synchronization control end sends the signal propagation delay to the first station.

S606: The first station receives a first network reference signal sent by the second station.

In this embodiment, the second station may periodically send the first network reference signal to the first station in a point-to-point manner.

A sequence for executing S605 and S606 is not limited.

S607: The first station calculates a synchronization reference time.

S608: The first station calculates an adjustment value.

Specifically, the adjustment value is a difference between the synchronization reference time and a sending time of the first network reference signal.

That is, a synchronization adjustment time is ΔT=T−Tpd−t, where T is a time when the first station receives the first network reference signal, t is a time when the second station sends the first network reference signal, and Tpd is the signal propagation delay.

S609: The first station adjusts local time according to the adjustment value.

Different from the foregoing embodiment, in this embodiment, the local time of the first station is adjusted according to the adjustment value, while a local synchronization time is not marked.

For example, the local time of the first station is 13:00 before adjustment, and the adjustment value is 1 minute. In this case, the local time of the first station is 13:01 after adjustment.

Different from the foregoing embodiments, in this embodiment, the synchronization control end triggers the synchronization process, and calculates in advance and delivers the signal propagation delay to a to-be-synchronized station, to control the entire synchronization process.

In this embodiment, the synchronization control end may be an operation, administration and maintenance (OAM) device. Because the OAM device has interfaces for communicating with the stations in the communications system, a synchronization control function in the synchronization method can be implemented more easily when the OAM device is used as the synchronization control end.

Figure 5:
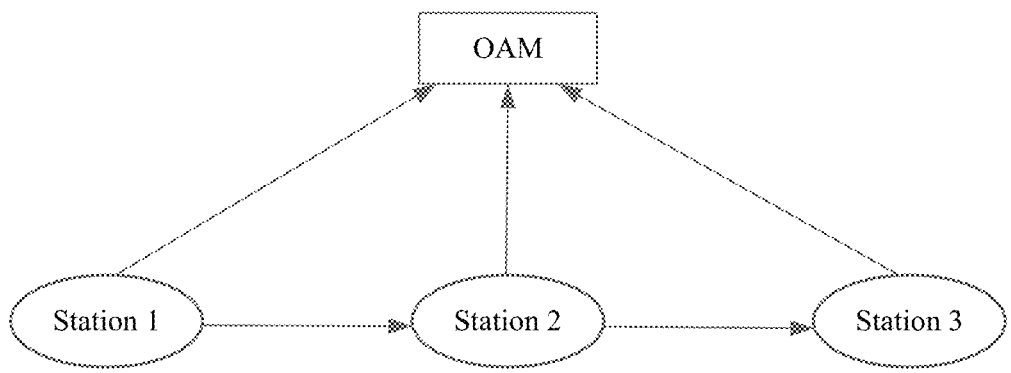
FIG. 5 is a schematic diagram of another application scenario of a synchronization method according to an embodiment of the present application.
Figure 7:
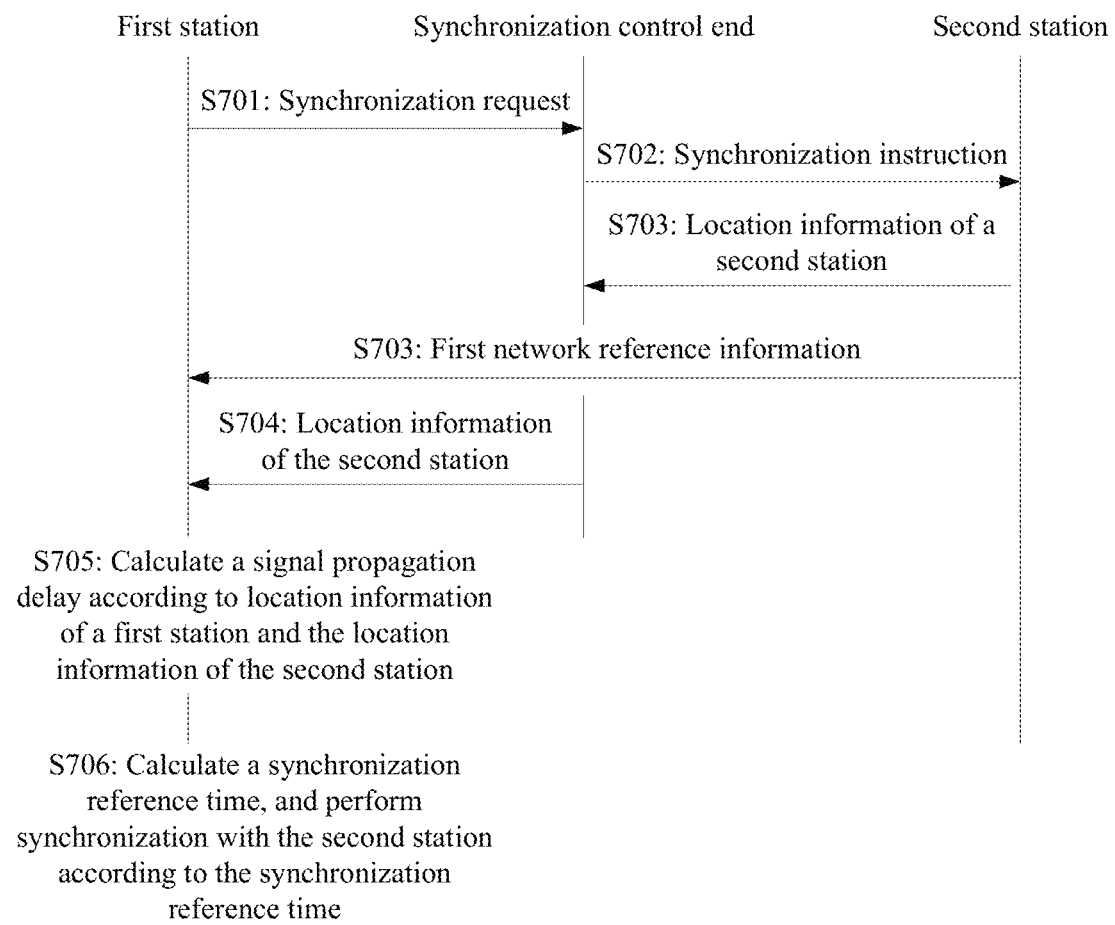
FIG. 7 is a flowchart of another synchronization method according to an embodiment of the present application.

Another synchronization method disclosed in an embodiment of this application may be applied to the communications system shown in FIG. 5. As shown in FIG. 7, the method described in this embodiment includes the following steps.

S701: A first station sends a synchronization request to a synchronization control end.

S702: The synchronization control end delivers a synchronization instruction to a second station.

S703: The second station sends location information of the second station to the synchronization control end and sends a first network reference signal to the first station.

S704: The synchronization control end delivers the location information of the second station to the first station.

S705: The first station calculates a signal propagation delay according to location information of the first station and the location information of the second station.

S706: The first station calculates a synchronization reference time, and performs synchronization with the second station according to the synchronization reference time.

In the method described in this embodiment, different from the foregoing embodiment, the synchronization control end delivers only location information of a source station, and a to-be-synchronized station calculates a propagation delay on its own.

In the foregoing embodiments, synchronization between two stations is used as an example for illustration. The method described in this application may also be used to implement synchronization between a plurality of stations, that is, enable a plurality of to-be-synchronized stations to perform synchronization with a source station.

Figure 8:
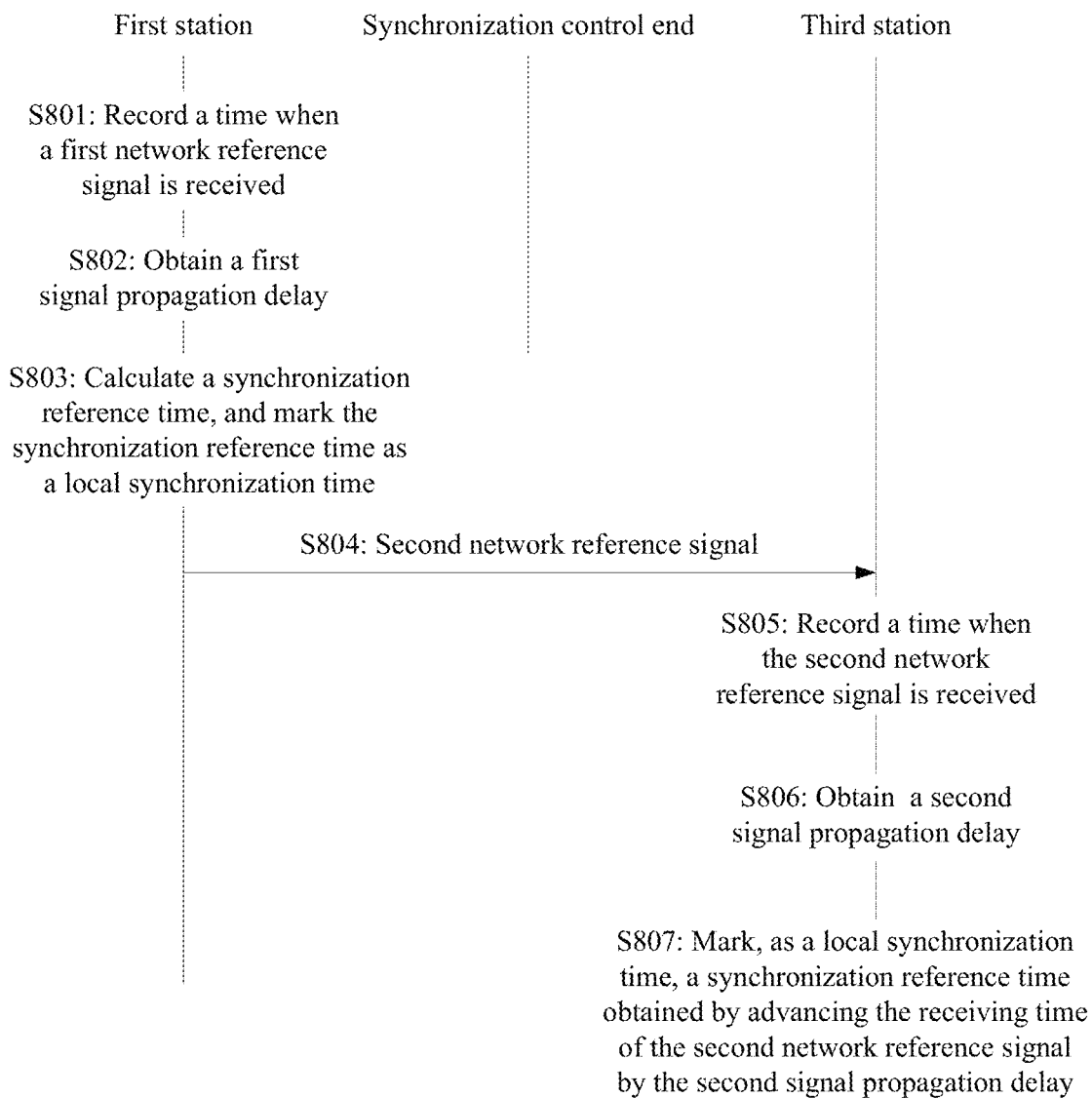
FIG. 8 is a flowchart of another synchronization method according to an embodiment of the present application.

An embodiment of this application discloses another synchronization method. For example, both a first station and a third station are synchronized with a second station. As shown in FIG. 8, the method includes the following steps.

S801: The first station records a time when a first network reference signal is received.

S802: The first station obtains a signal propagation delay between the first station and the second station, and marks the signal propagation delay as a first signal propagation delay.

For a specific manner of obtaining the first signal propagation delay, refer to the foregoing embodiments. Details are not repeated herein.

S803: The first station calculates a synchronization reference time, and marks the synchronization reference time as a local synchronization time.

S804: The first station sends a second network reference signal.

Specifically, the first station may send the second network reference signal in a next synchronization period after synchronization is completed within a current synchronization period. A function of the second network reference signal for the third station is the same as a function of the first network reference signal for the first station. For a specific form and a sending manner of the second network reference signal, refer to a related description of the first network reference signal.

S805: The third station records a time when the second network reference signal is received.

S806: The third station obtains a signal propagation delay between the second station and the third station, and marks the signal propagation delay as a second signal propagation delay.

Specifically, for the manner of obtaining the second signal propagation delay by the third station, refer to the manner of obtaining the first signal propagation delay by the first station in the foregoing embodiments. Details are not repeated herein.

S807: The third station marks, as a local synchronization time, a synchronization reference time obtained by subtracting the second signal propagation delay from the receiving time of the second network reference signal.

Alternatively, after receiving the second network reference signal, the third station may perform synchronization with the first station according to the prior-art synchronization method.

The method described in this embodiment can be used to implement high-accuracy synchronization between a plurality of stations. In addition, if the third station is relatively far from the second station and cannot listen to the first network reference signal of the second station, synchronization between the third station and the second station can still be implemented by using the second station as an intermediate station.

It should be noted that only three stations are used as an example in this embodiment. Synchronization between more stations is implemented in a similar manner.

Figure 9:
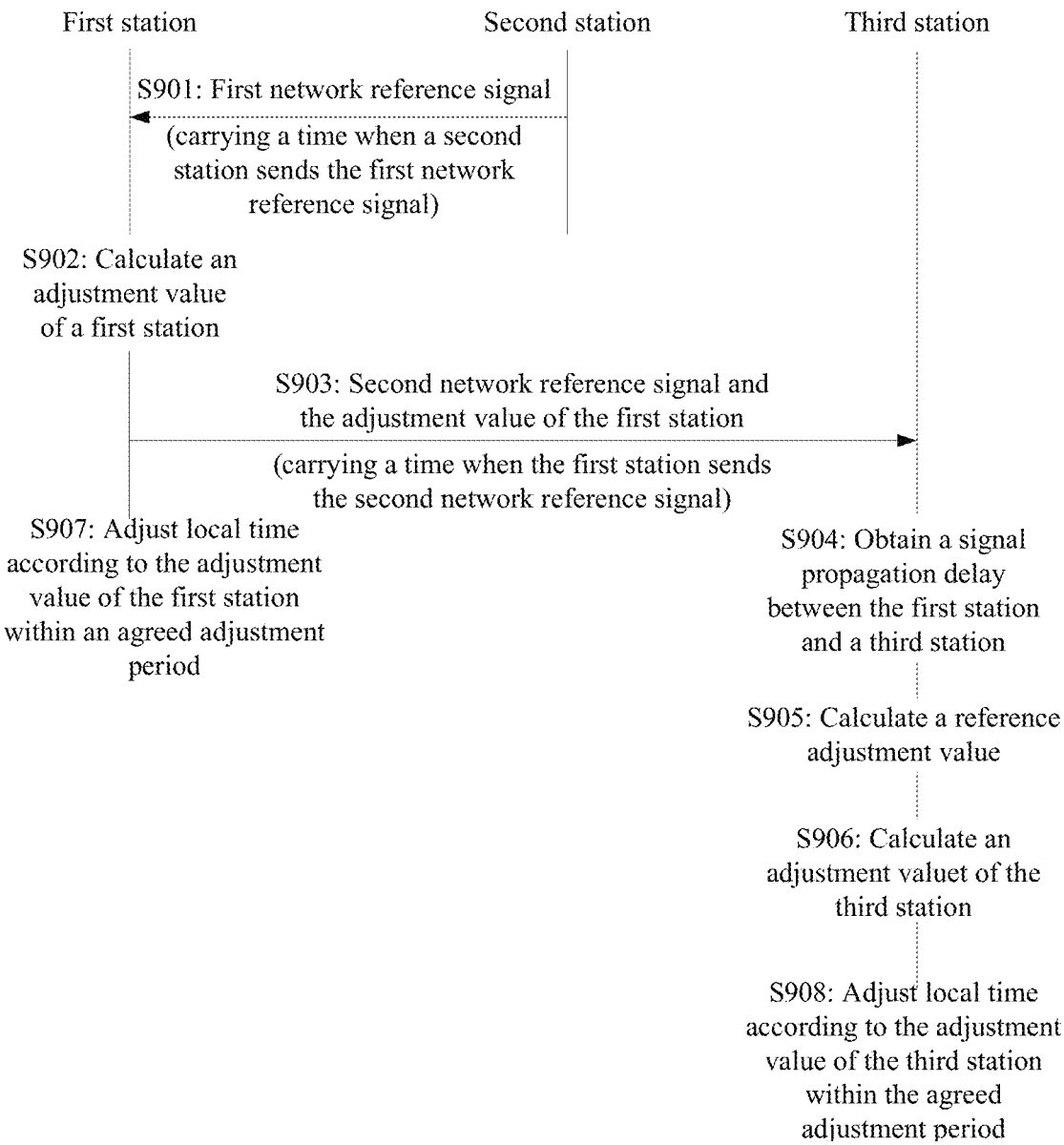
FIG. 9 is a flowchart of another synchronization method according to an embodiment of the present application.

An embodiment of this application discloses another synchronization method. For example, both a first station and a third station are synchronized with a second station. As shown in FIG. 9, the method includes the following steps.

S901: The first station receives a first network reference signal sent by the second station.

The first network reference signal carries a time when the second station sends the first network reference signal.

S902: The first station calculates an adjustment value, where the adjustment value is a difference between a synchronization reference time of the first station and the sending time of the first network reference signal, and is marked as an adjustment value of the first station.

Specifically, the adjustment value of the first station is $\Delta t1=T1-Tpd1-t1$, where T1 is a receiving time of the first network reference signal, Tpd1 is a signal propagation delay between the first station and the second station, and t1 is the sending time of the first network reference signal.

S903: The first station sends a second network reference signal and the adjustment value of the first station.

The second network reference signal carries a time when the first station sends the second network reference signal. The adjustment value of the first station may be sent separately, or sent by a synchronization control end, or carried in the second network reference signal and sent by using the second network reference signal.

S904: The third station obtains a signal propagation delay between the first station and the third station.

S905: The third station calculates an adjustment value of the third station relative to the first station, that is, a reference adjustment value.

Specifically, the reference adjustment value is $\Delta t2=T2-Tpd2-t2$, where T2 is a receiving time of the second network reference signal, Tpd2 is the signal propagation delay between the first station and the third station, and t2 is the sending time of the second network reference signal.

S906: The third station calculates an adjustment value of the third station, where the adjustment value of the third station is a sum of the adjustment value of the first station and the reference adjustment value, that is, $\Delta t3=\Delta t1+\Delta t2$.

S907: The first station adjusts local time according to the adjustment value of the first station.

S908: The third station adjusts local time according to the adjustment value of the third station.

Optionally, the first station and the third station may adjust their local time in a same adjustment time (within an agreed adjustment period) (FIG. 9), or may adjust their local time in different adjustment times. This is not limited herein.

In this embodiment, a to-be-synchronized station is used as a relay station, to implement high-accuracy synchronization between another station and a source station.

Figure 10:
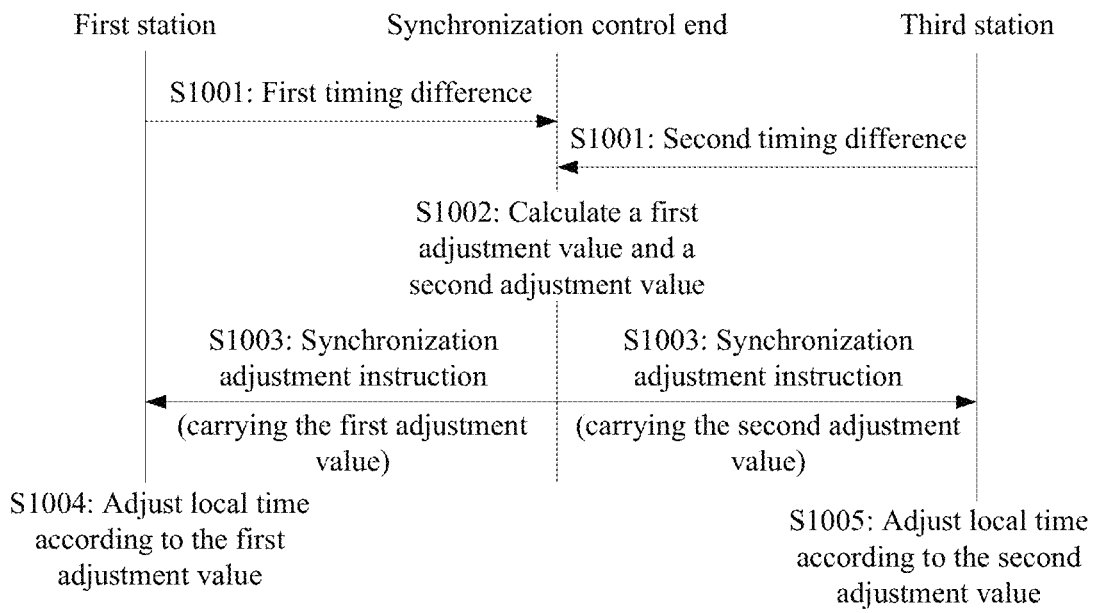
FIG. 10 is a flowchart of another synchronization method according to an embodiment of the present application.

An embodiment of this application discloses another synchronization method. Different from the foregoing embodiments, in this embodiment, a synchronization control end delivers synchronization instructions to a plurality of to-be-synchronized stations to control synchronization of the plurality of stations at the same time. As shown in FIG. 10, the method includes the following steps.

S1001: The synchronization control end receives a first timing difference and a second timing difference.

The first timing difference is a difference, reported by a first station, between a time when the first station receives a first network reference signal and a time when a second station sends the first network reference signal. The second timing difference is a difference, reported by a third station, between a time when the third station receives a second network reference signal and a time when the first station sends the second network reference signal.

S1002: The synchronization control end calculates a first adjustment value and a second adjustment value.

The first adjustment value is a difference between the first timing difference and a first signal propagation delay. The second adjustment value is a difference between the second timing difference and a second signal propagation delay. The first signal propagation delay is a signal propagation delay between the first station and the second station. The second signal propagation delay is a signal propagation delay between the second station and the third station.

S1003: The synchronization control end delivers synchronization adjustment instructions to the first station and the third station simultaneously.

A synchronization adjustment instruction delivered to the first station carries the first adjustment value, and a synchronization adjustment instruction delivered to the third station carries the second adjustment value.

S1004: The first station adjusts local time according to the first adjustment value.

S1005: A third station adjusts local time according to the second adjustment value.

In this embodiment, the synchronization control end controls synchronization processes of all the to-be-synchronized stations, to implement synchronization of stations in an area, and compensates for a path propagation delay of a signal, to improve synchronization accuracy and implement synchronization between relatively remote stations.

In the foregoing embodiments relating to a plurality of to-be-synchronized stations, two to-be-synchronized stations are used an example for illustration. Based on the case of two to-be-synchronized stations, a synchronization process of more than two to-be-synchronized stations may be deduced by analog, and details are not repeated herein.

Figure 11:
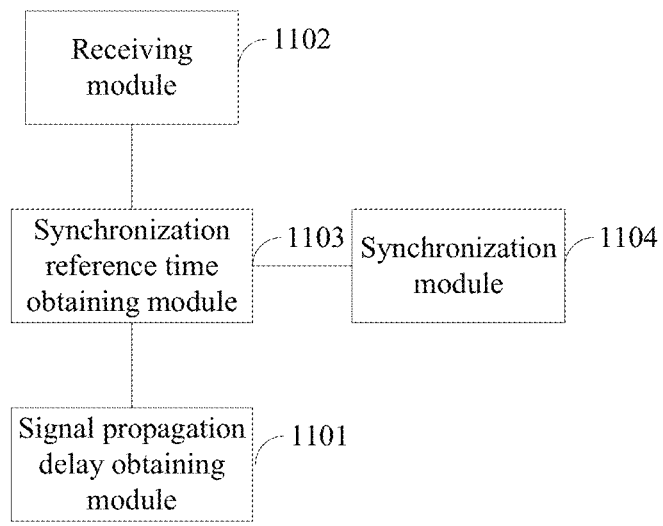
FIG. 11 is a schematic structural diagram of a station according to an embodiment of the present application.

Corresponding to the foregoing method embodiments, an embodiment of this application further discloses a station, where the station may be a macro cell or a small cell. As shown in FIG. 11, the station includes:
- a signal propagation delay obtaining module 1101, configured to obtain a signal propagation delay between the station and a source station, where the station is a to-be-synchronized station;
- a receiving module 1102, configured to receive a first network reference signal from the source station;
- a synchronization reference time obtaining module 1103, configured to obtain a synchronization reference time by subtracting the signal propagation delay from a receiving time of the first network reference signal; and
- a synchronization module 1104, configured to perform synchronization with the source station according to the synchronization reference time.

Figure 12:
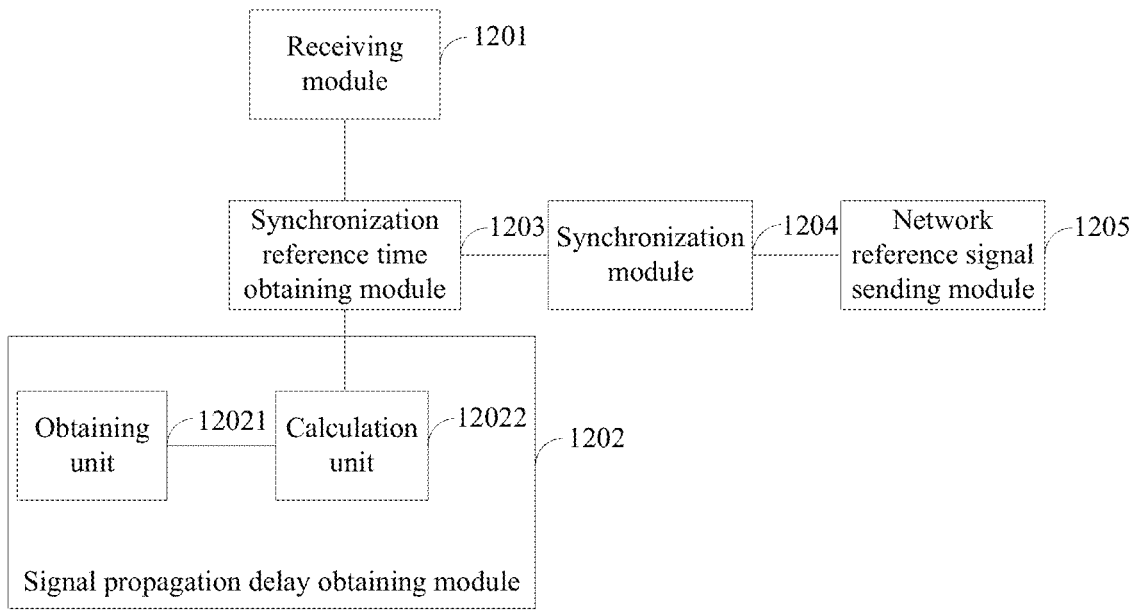
FIG. 12 is a schematic structural diagram of another station according to an embodiment of the present application.

FIG. 12 shows a specific implementation form of the station in FIG. 11. The station may be a macro cell or a small cell, including a receiving module 1201, a signal propagation delay obtaining module 1202, a synchronization reference time obtaining module 1203, and a synchronization module 1204.

The receiving module 1201 is configured to receive a first network reference signal from a source station.

The signal propagation delay obtaining module 1202 specifically includes an obtaining unit 12021 and a calculation unit 12022.

The obtaining unit 12021 is configured to obtain location information of the station and location information of the source station.

A specific implementation of obtaining the location information of the source station by the obtaining unit may be: obtaining the location information of the source station from the first network reference signal, or receiving the location information of the source station sent by a synchronization control end.

A specific implementation of obtaining the location information of the station by the obtaining unit may be: locally obtaining the location information of the station, or receiving the location information of the station sent by the synchronization control end.

The calculation unit 12022 is configured to calculate a signal propagation delay between the station and the source station according to the location information of the station and the location information of the source station.

The synchronization reference time obtaining module 1203 is configured to obtain a synchronization reference time by subtracting the signal propagation delay from a receiving time of the first network reference signal.

The synchronization module 1204 is configured to mark the synchronization reference time as a local synchronization time.

Based on the foregoing synchronization manner, to implement synchronization between a plurality of to-be-synchronized stations, the station described in this embodiment may further include:
- a network reference signal sending module 1205, configured to determine a second network reference signal after the synchronization module marks the synchronization reference time as the local synchronization time, so that another to-be-synchronized station receives the second network reference signal from the station, and performs synchronization with the station according to the second network reference signal.

Figure 13:
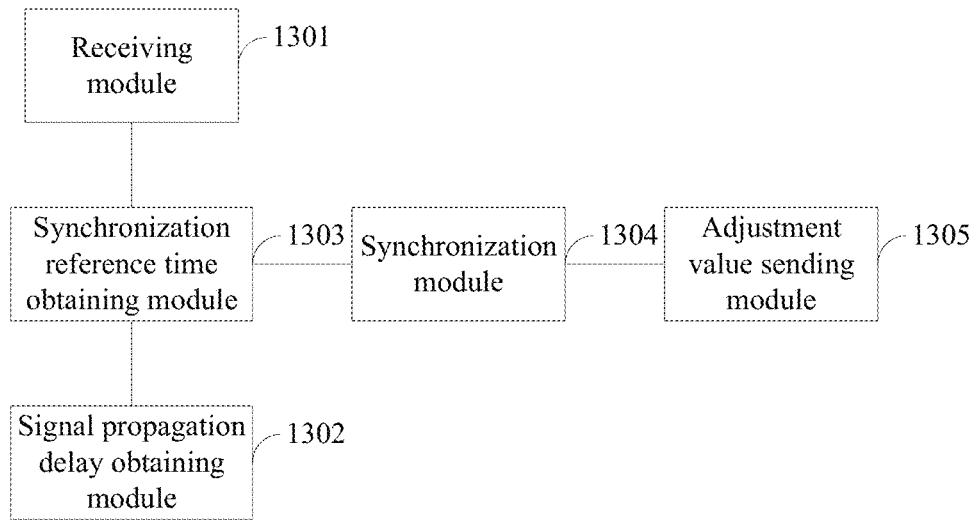
FIG. 13 is a schematic structural diagram of another station according to an embodiment of the present application.

FIG. 13 shows another specific implementation form of the station shown in FIG. 11. The station may be a macro cell or a small cell, including:
- a receiving module 1301, configured to receive a first network reference signal sent by a source station;
- a signal propagation delay obtaining module 1302, configured to receive a signal propagation delay sent by a synchronization control end, or obtain a signal propagation delay from the received first network reference signal;
- a synchronization reference time obtaining module 1303, configured to obtain a synchronization reference time by subtracting the signal propagation delay from a receiving time of the first network reference signal; and
- a synchronization module 1304, configured to calculate an adjustment value, and adjust local time according to the adjustment value, where the adjustment value is a difference between the synchronization reference time and a sending time of the first network reference signal.

Based on this synchronization manner, to implement synchronization between a plurality of to-be-synchronized stations, the station described in this embodiment may further include an adjustment value sending module 1305.

The adjustment value sending module 1305 is configured to send the adjustment value, where the adjustment value is used by another to-be-synchronized station to calculate an adjustment value between the another to-be-synchronized station and the source station, and the adjustment value between the another to-be-synchronized station and the source station is used by the another to-be-synchronized station to perform synchronization with the source station. Specifically, for a method used by the other to-be-synchronized station to calculate its adjustment value and perform synchronization, refer to the manner used by the first station. Details are not repeated herein.

When the station described in the foregoing embodiments is used as a to-be-synchronized station, the propagation delay may be used to compensate for the synchronization reference time, to improve synchronization accuracy.

Figure 14:
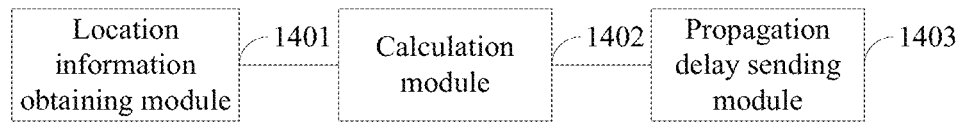
FIG. 14 is a schematic structural diagram of a synchronization apparatus according to an embodiment of the present application.

As shown in FIG. 14, a synchronization apparatus disclosed in an embodiment of this application includes:

a location information obtaining module 1401, configured to obtain location information of a station, where the location information of the station is used to determine a signal propagation delay between a first station and a second station, the first station is a to-be-synchronized station, the second station is a source station, the location information of the station includes at least location information of the second station, the propagation delay is used to calculate a synchronization reference time of the first station, where the synchronization reference time is used by the first station to perform synchronization with the second station, and the synchronization reference time is obtained by subtracting the signal propagation delay from a receiving time of a first network reference signal received by the first station from the second station.

The apparatus described in this embodiment may be disposed in an OAM, to achieve an objective of controlling an inter-station synchronization process by using the OAM.

Specifically, a specific implementation of obtaining location information of a station by the location information obtaining module may be: obtaining location information of the first station and the location information of the second station. Further, the location information obtaining module receives the location information of the first station sent by the first station, and receives the location information of the second station sent by the second station; or locally obtains the location information of the first station and the location information of the second station.

After the location information obtaining module obtains the location information of the first station and the location information of the second station, the synchronization apparatus described in this embodiment may further include:

a calculation module 1402, configured to calculate the signal propagation delay between the first station and the second station according to the location information of the first station and the location information of the second station after the location information obtaining module obtains the location information of the first station and the location information of the second station; and a propagation delay sending module 1403, configured to send the signal propagation delay between the first station and the second station to the first station.

The synchronization apparatus described in this embodiment can calculate the signal propagation delay between the to-be-synchronized station and the source station and send the signal propagation delay to the to-be-synchronized station, to improve accuracy of synchronization between the to-be-synchronized station and the source station.

Figure 15:
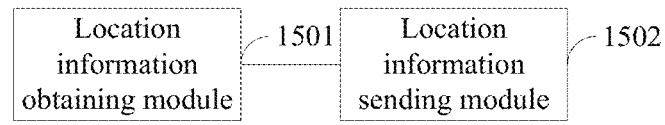
FIG. 15 is a schematic structural diagram of another synchronization apparatus according to an embodiment of the present application.

FIG. 15 shows another synchronization apparatus disclosed in an embodiment of this application, including:

a location information obtaining module 1501, configured to receive location information of a second station sent by the second station; and a location information sending module 1502, configured to send the location information of the second station to a first station, where the location information of the second station is used by the first station to calculate a signal propagation delay between the first station and the second station.

In this embodiment, the first station is a to-be-synchronized station, and the second station is a source station. After receiving the location information of the second station, the first station may calculate the signal propagation delay between the first station and the second station, and perform synchronization. For a specific process, refer to the method embodiments. Details are not repeated herein.

After receiving the location information of the source station sent by the source station, the synchronization apparatus described in this embodiment sends the location information of the source station to the to-be-synchronized station, to improve synchronization accuracy.

Figure 16:
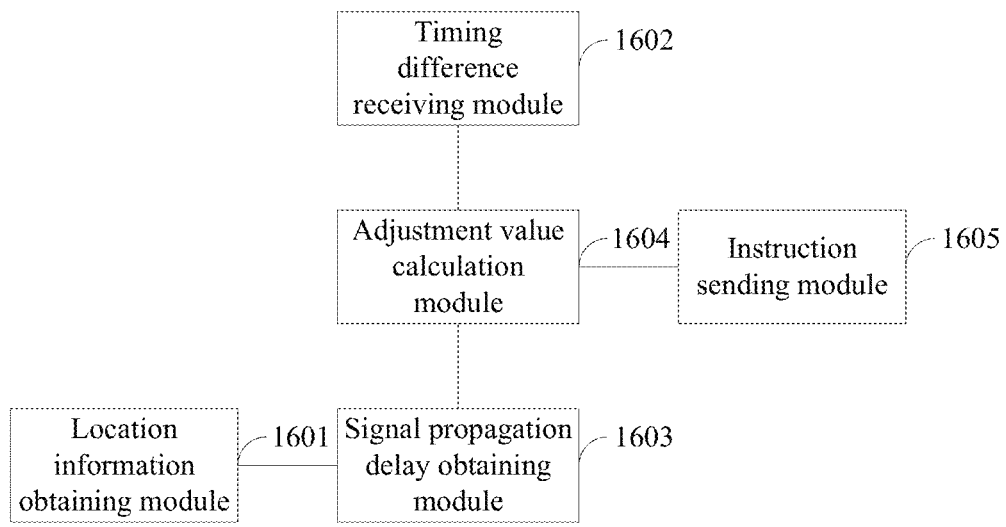
FIG. 16 is a schematic structural diagram of another synchronization apparatus according to an embodiment of the present application.

FIG. 16 shows another synchronization apparatus disclosed in an embodiment of this application, including a location information obtaining module 1601, a timing difference receiving module 1602, a signal propagation delay obtaining module 1603, an adjustment value calculation module 1604, and an instruction sending module 1605.

The location information obtaining module 1601 is configured to receive location information of a second station sent by the second station.

The timing difference receiving module 1602 is configured to receive timing differences separately sent by at least two to-be-synchronized stations. A timing difference of any one of the to-be-synchronized stations is a difference between a time when the station receives a first network reference signal sent by the second station and a time when the second station sends the first network reference signal, and the at least two to-be-synchronized stations include a third station and a first station.

The signal propagation delay obtaining module 1603 is configured to obtain signal propagation delays between the at least two to-be-synchronized stations and their respective source stations.

For a method for obtaining a signal propagation delay, refer to the foregoing embodiments. Details are not repeated herein.

The adjustment value calculation module 1604 is configured to separately calculate adjustment values of the at least two to-be-synchronized stations according to the timing differences and the signal propagation delays.

An adjustment value of any one of the to-be-synchronized stations is a difference between a timing difference of the to-be-synchronized station and a signal propagation delay between the to-be-synchronized station and a corresponding source station.

The instruction sending module 1605 is configured to send synchronization instructions to the at least two to-be-synchronized stations simultaneously. A synchronization instruction sent to any one of the to-be-synchronized stations carries an adjustment value corresponding to the station, and the adjustment value is used by the station to adjust local time.

In this embodiment, the synchronization apparatus calculates the adjustment values of the to-be-synchronized stations relative to their respective source stations, and delivers the adjustment values to the plurality of to-be-synchronized stations. In this way, the synchronization apparatus can control the plurality of to-be-synchronized stations to perform synchronization adjustments simultaneously, and implement synchronization between the plurality of to-be-synchronized stations.

An embodiment of this application discloses another station, where the station may be a macro cell or a small cell. The station includes:

a synchronization information sending module, configured to send synchronization information.

The synchronization information includes location information of the station, the location information of the station is used together with location information of a to-be-synchronized station to determine a signal propagation delay between the to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the signal propagation delay from a receiving time of a first network reference signal received by the to-be-synchronized station from the station. The station is a source station.

When the synchronization information includes location information of the station, a specific implementation of sending the synchronization information by the synchronization information sending module is: sending the first network reference signal, where the first network reference signal carries the location information of the station. Alternatively, another specific implementation of sending the synchronization information by the synchronization information sending module is: sending the location information of the station to a synchronization control end, so that the synchronization control end sends the location information of the station to the to-be-synchronized station, or determines the signal propagation delay between the to-be-synchronized station and the station according to the location information of the station and the location information of the to-be-synchronized station.

Alternatively, the synchronization information includes a signal propagation delay between a to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the signal propagation delay from a receiving time of a first network reference signal received by the to-be-synchronized station from the station. The station is a source station.

When the synchronization information includes the signal propagation delay, a specific implementation of sending the synchronization information by the synchronization information sending module may be: sending the first network reference signal, where the first network reference signal carries the signal propagation delay between the to-be-synchronized station and the station.

It should be noted that, in this embodiment, the synchronization information sending module may send the first network reference signal only within a synchronization period, and/or send the first network reference signal by using only an idle resource of the to-be-synchronized station.

The station described in this embodiment, serving as the source station for synchronization, may send the location information of the station, or send the propagation delay between the station and the to-be-synchronized station, to improve synchronization accuracy of the to-be-synchronized station.

An embodiment of this application further discloses a synchronization system, including a first station (a to-be-synchronized station) and a second station (a source station). For a function and a structure of the first station, refer to the station shown in FIG. 11 or FIG. 12. Details are not repeated herein.

The second station is configured to send synchronization information, where the synchronization information includes location information of the second station, or a signal propagation delay between the first station and the second station.

In this embodiment, the location information sent by the second station is helpful for the first station to calculate the signal propagation delay between the first station and the second station, to improve synchronization accuracy.

Another synchronization system disclosed in an embodiment of this application includes a first station (a to-be-synchronized station), a second station (a source station), and a synchronization apparatus.

For a function and a structure of the first station, refer to the station shown in FIG. 11 or FIG. 13. Details are not repeated herein.

The second station is configured to send synchronization information, where the synchronization information includes location information of the second station, or a signal propagation delay between the first station and the second station.

For a function and a structure of the synchronization apparatus, refer to the synchronization apparatus shown in FIG. 14, FIG. 15, or FIG. 16. Details are not repeated herein.

In the synchronization system described in this embodiment, the synchronization apparatus can control the first station to perform synchronization with the second station.

An embodiment of this application further discloses a station, including a receiver, a processor, and a memory. The receiver, the processor, and the memory may communicate with each other by using a bus.

Specifically, the receiver receives a first network reference signal from a source station.

The processor is configured to obtain a signal propagation delay between the station and the source station, obtain a synchronization reference time by subtracting the signal propagation delay from a receiving time of the first network reference signal, and perform synchronization with the source station according to the synchronization reference time, where the station is a to-be-synchronized station.

The memory is configured to store a program running in the processor, and data generated in a running process of the program.

For other functions that can be implemented by the processor described in this embodiment, refer to the functions that can be implemented by the first station in the foregoing embodiments. Details are not repeated herein.

The station described in this embodiment, used as the to-be-synchronized station, can improve synchronization accuracy.

Another synchronization device disclosed in an embodiment of this application includes a processor and a memory. The processor and the memory communicate with each other by using a bus.

Specifically, the processor is configured to obtain location information of a station, where the location information of the station is used to determine a signal propagation delay between a first station and a second station, the first station is a to-be-synchronized station, the second station is a source station, the location information of the station includes at least location information of the second station, the signal propagation delay is used to calculate a synchronization reference time of the first station, where the synchronization reference time is used by the first station to perform synchronization with the second station, and the synchronization reference time is obtained by subtracting the signal propagation delay from a receiving time of a first network reference signal received by the first station from the second station.

The memory is configured to store a program running in the processor, and data generated in a running process of the program.

For a detailed description of the synchronization device, refer to related content of other embodiments of the present application. Details are not repeated herein.

The synchronization device described in this embodiment may be specifically an OAM that controls a synchronization process to improve synchronization accuracy.

An embodiment of this application further discloses another station, including a transmitter, configured to send synchronization information.

Specifically, the synchronization information includes location information of the station, the location information of the station is used together with location information of a to-be-synchronized station to determine a signal propagation delay between the to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the propagation delay from a receiving time of a first network reference signal received by the to-be-synchronized station from the station.

Alternatively, the synchronization information includes a signal propagation delay between a to-be-synchronized station and the station, the signal propagation delay is used to calculate a synchronization reference time of the to-be-synchronized station, the synchronization reference time is used by the to-be-synchronized station to perform synchronization with the station, and the synchronization reference time is obtained by subtracting the propagation delay from a receiving time of a first network reference signal received by the to-be-synchronized station from the station.

The station described in this embodiment, serving as a source station, sends the synchronization information, enabling the to-be-synchronized station to obtain relatively high synchronization accuracy.

For a detailed description of the station, refer to related content of other embodiments of the present application. Details are not repeated herein.

If the functions of the method in the embodiment are implemented in the form of a software functional unit and sold or used as an independent product, the functions may be stored in a computing device-readable storage medium. Based on such an understanding, the part of the embodiments of the present application contributing to the prior art or some of the technical solutions may be implemented in a form of a software product. The software product is stored in a storage medium, and includes several instructions for instructing a computing device (which may be a personal computer, a server, a mobile computing device, a network device, or the like) to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The embodiments in this specification are all described in a progressive manner. Each embodiment focuses on a difference from other embodiments. For same or similar parts in the embodiments, mutual reference may be made between these embodiments.

The embodiments disclosed above are described to enable a person skilled in the art to implement or use the present application. Various modifications to the embodiments are obvious to the person skilled in the art, and general principles defined in this specification may be implemented in other embodiments without departing from the spirit or scope of the present application. Therefore, the present application is not intended to be limited to these embodiments illustrated in this specification, but shall be construed in the widest scope consistent with the principles and novel features disclosed in this specification.

What is claimed is:

1. A synchronization method, comprising:
   obtaining, by a first base station, location information of the first base station, wherein the first base station is a to-be-synchronized base station;
   receiving, by the first base station, location information of a second base station from a synchronization control end, wherein the second base station is a source base station and the synchronization control end includes an operation, administration and maintenance 'OAM' device;
   calculating, by the first base station, a signal propagation delay between the first base station and the second base station according to the location information of the first base station and the location information of the second base station received from the OAM device;
   receiving, by the first base station, a first network reference signal from the second base station;
   obtaining, by the first base station, a synchronization reference time by subtracting the signal propagation delay from a receiving time of the first network reference signal; and
   performing, by the first base station, synchronization with the second base station according to the synchronization reference time.

2. The method according to claim 1, wherein obtaining, by the first base station, location information of the first base station comprises:
   locally obtaining, by the first base station, the location information of the first base station; or
   receiving, by the first base station, the location information of the first base station from the synchronization control end.

3. The method according to claim 1, wherein performing, by the first base station, synchronization with the second base station according to the synchronization reference time comprises:
   marking, by the first base station, the synchronization reference time as a local synchronization time.

4. The method according to claim 3, further comprising:
   determining, by the first base station, a second network reference signal, to cause a third base station to perform synchronization with the first base station according to the second network reference signal.

5. The method according to claim 1, wherein performing, by the first base station, synchronization with the second base station according to the synchronization reference time comprises:
   calculating, by the first base station, an adjustment value of the first base station, wherein the adjustment value of the first base station is a difference between the synchronization reference time and a sending time of the first network reference signal; and adjusting, by the first base station, local time according to the adjustment value of the first base station.

6. The method according to claim 5, further comprising: sending, by the first base station, the adjustment value of the first base station for causing a third base station to calculate an adjustment value of the third base station, wherein the adjustment value of the third base station is a sum of the adjustment value of the first base station and an adjustment value of the third base station relative to the first base station, the adjustment value of the third base station for synchronization between the third base station and the second base station.

7. A base station, comprising:
a processor; and
a memory for storing a program comprising instructions to be executed on the processor, wherein the instructions, when executed by the processor, cause the base station to:
obtain location information of the base station, wherein the base station is a to-be-synchronized base station,
receive location information of a source base station from a synchronization control end including an operation, administration and maintenance 'OAM' device,
calculate a signal propagation delay between the base station and the source base station according to the location information of the base station and the location information of the source base station received from the OAM device,
receive a first network reference signal from the source base station,
obtain a synchronization reference time by subtracting the signal propagation delay from a receiving time of the first network reference signal, and
perform synchronization with the source base station according to the synchronization reference time.

8. The base station according to claim 7, wherein to obtain location information of the base station, the instructions, when executed by the processor, cause the base station to:
locally obtain the location information of the base station; or
receive the location information of the base station from the synchronization control end.

9. The base station according to claim 7, wherein to perform synchronization with the source base station according to the synchronization reference time, the instructions, when executed by the processor, cause the base station to:
mark the synchronization reference time as a local synchronization time.

10. The base station according to claim 9, wherein the memory further comprises instructions that, when executed by the processor, cause the base station to:
determine a second network reference signal; and
perform synchronization with the second base station according to the second network reference signal.

11. The base station according to claim 7, wherein to perform synchronization with the source base station according to the synchronization reference time, the instructions, when executed by the processor, cause the base station to:
calculate an adjustment value of the base station; and
adjust local time according to the adjustment value of the first base station, wherein the adjustment value of the first base station is a difference between the synchronization reference time and a sending time of the first network reference signal.

12. The base station according to claim 11, wherein the memory further comprises instructions that, when executed by the processor, cause the base station to:
send the adjustment value of the base station for causing a third base station to calculate an adjustment value of the third base station, wherein the adjustment value of the third base station is a sum of the adjustment value of the base station and an adjustment value of the third base station relative to the source base station, the adjustment value of the third base station for synchronization between the third base station and the source base station.

13. A system, comprising:
a first base station and a second base station;
wherein the first base station is configured to:
obtain location information of the first base station,
receive location information of the second base station from a synchronization control end including an operation, administration and maintenance 'OAM' device,
calculate a signal propagation delay between the first base station and the second base station according to the location information of the first base station and the location information of the second base station received from the OAM device,
receive a first network reference signal from the second base station,
obtain a synchronization reference time by subtracting the signal propagation delay from a receiving time of the first network reference signal, and
perform synchronization with the second base station according to the synchronization reference time; and
wherein the second base station is configured to send the first network reference signal to the first base station, wherein the first base station is a to-be-synchronized base station, and the second base station is a source base station.

* * * * *